Figure 1:
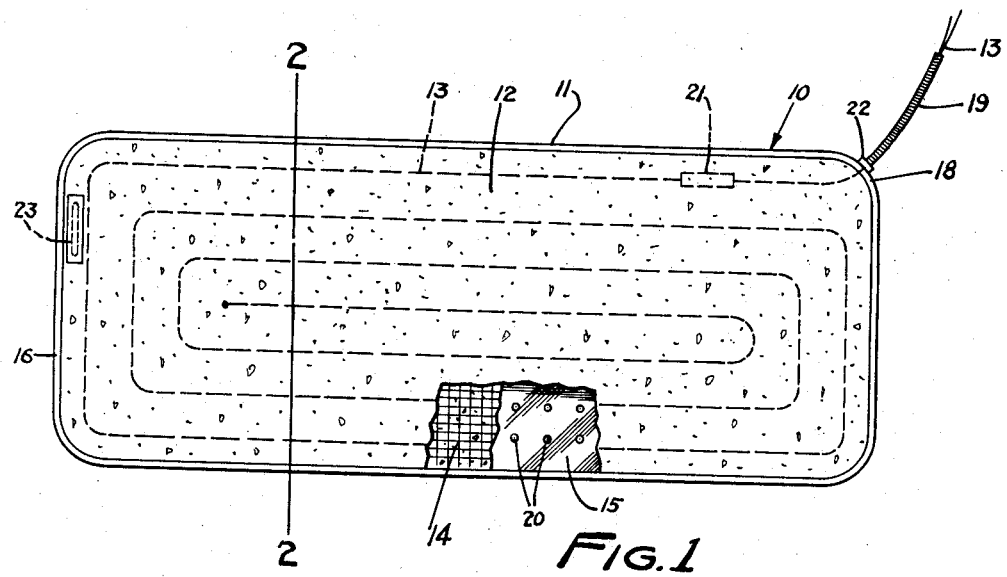

Dec. 23, 1958

C. H. NEELY 2,866,066

ANIMAL BED

Filed May 23, 1955

INVENTOR.
CARROLL H. NEELY
BY
*Paul, Moore & Dugger*
ATTORNEYS

United States Patent Office 2,866,066
Patented Dec. 23, 1958

2,866,066

ANIMAL BED

Carroll H. Neely, Cresco, Iowa

Application May 23, 1955, Serial No. 510,429

8 Claims. (Cl. 219—19)

This invention relates to a heated animal bed or pen comprising a durable heated slab of relatively chemically inert, non-porous material having the specific features as described, the specific form of the invention being extremely useful as a bed or pen for newly farrowed pigs to enable them to survive during the time when artificial heat is necessary.

In the raising of pigs, particularly, it is necessary after the young are farrowed to provide artificial heat for some days, otherwise the pig young will die. This is commonly provided by a heat lamp suspended from a light socket around which the little pigs cluster. However, great disadvantage is found in the use of a heat lamp, since the heat is ineffectively distributed, concentrated at one spot so that pigs too close to lamp may become severely burned, yet pigs slightly removed from the lamp may die from insufficient heat. Further, such heat does not dry the bed of moisture from the pigs' bodies.

Broadly speaking, this invention comprises an animal bed of relatively chemically inert and moisture impervious material, having an electrical heating element providing a uniform heat throughout the extension thereof.

It is therefore an object of this invention to provide a new and useful radiant heated slab pen to warm newly farrowed pigs and other animals until they can survive without artificial heat;

It is a further object of this invention to provide an animal bed heated uniformly throughout its extension by embedded resistant electrical wiring:

A further object of this invention is to provide an animal bed of synthetic resinous material and concrete;

Still another object of this invention is to provide an animal warming device for warming the animals from the floor of their bed and thus precluding the presence of animal moisture on such bed;

Still a further object of this invention is to provide a new and useful animal bed having an electrical heating element embedded therein and provided with insulation at the sides and bottom of the bed so as to direct all of the heat upwardly and through to the upper surface of the bed;

Still a further object of this invention is the position of a heated animal bed comprising reinforced concrete in a rigid container;

Other and further objects of the invention are those inherent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, but these are indicative, however, of but a few of the various ways in which the principles of the invention may be employed.

This invention will be described with reference to the drawings in which like numerals refer to like parts.

Figure 2:
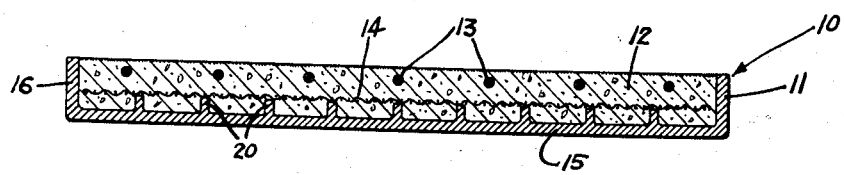
Figure 3:
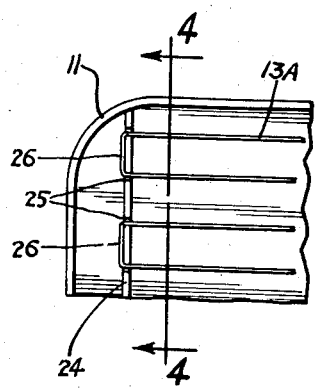
Figure 4:
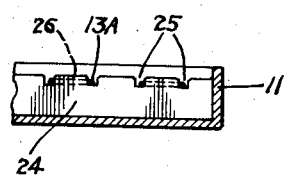

Figure 1 comprises a top plan view of the animal bed, partly broken away;

Figure 2 comprises a vertical sectional view of the bed of Figure 1, taken along the line 2—2 thereof;

Figure 3 shows a fragmentary plan view on an enlarged scale of a modified form of the invention; and Figure 4 shows a fragmentary vertical sectional view taken along the line and in the direction of the arrows 4—4 of Figure 3.

With reference now to the drawings and particularly to Figure 1, there is shown a bed generally designated 10 comprising a synthetic resinous shell 11 containing therein a concrete slab 12 in which is embedded a heating element 13 and a reinforcing screen 14.

The shell 11 provides a bottom 15 integrally joined to a peripheral upright wall 16 to one corner 18 of which is secured the flexible protective sheathing 19 for the heating element 13.

The bottom 15 is provided with a plurality of upwardly projecting studs or pins 20 which may be disposed at random or in pattern as desired, but which serve to provide an anchoring means for the slab 12.

The shell 11 is rounded at the corners to preclude sharp projections and to give added strength, and in practice is usually molded for convenience.

The shell should be rigid to protect the edges of the bed 10 and the slab 12 from breakage, should be made of a material that is a non or poor conductor of electricity and heat and which will not absorb moisture. It must be able to withstand the heat or moisture commonly used in cleaning farrowing equipment, for, hot lye water and steam cleaning are common methods of cleaning such equipment to comply with the high sanitation standards required in the raising of pigs.

It has been found in practice that rigid synthetic resinous materials such as phenol formaldehyde and other phenolic resins; and urea-formaldehyde and other urea resins are particularly adapted for the formation of the shell.

The reinforcing screen or mesh 14 may be any suitable material, preferably wire providing a reticulated surface with relatively small apertures. The screen 14 as shown in Figure 2 is positioned above the pins 20 since the pins 20 terminate short of the median line of the slab 12. However, it is to be understood that a suitable extension of the pins 20 may be provided and any suitable positioning of the screen 14 may be utilized, such as the screen being positioned further above the tops of the pins, or the pins being inserted in apertures therethrough without departing from the spirit and scope of this invention.

The heating element 13 as shown in Figure 2 is positioned in the slab in elongated involute form, but any suitable coil or pattern may be used that provides substantially uniform heat to the entire extension of the slab. The heating element comprises an electrical resistant wire of suitable resistance.

Secured to the heating element 13 is an appropriate thermostat 21 for controlling the flow of current thereto.

The slab 12 usually comprises poured concrete and should have a co-efficient of expansion substantially equivalent to that of the shell. The slab, as well as the shell, must be relatively chemically inert and impervious to moisture. However, unlike the shell, the slab while it should be an electrical insulator should be a heat conductor. It has been found that concrete fulfills these requisites very well.

The sheathing 19 may be a spring wire or a flexible synthetic resinous hose, such as polyethylene, or vinyl resin and is protected from the entrance of moisture at its juncture with the shell 11 by a ferrule 22 embedded, molded or otherwise tightly secured to the shell and in which the end of the sheathing 19 is threaded or pressed.

Thus, the bed comprises a conductive layer on top and an insulating layer on the bottom.

A thermometer 23 is provided at one corner of the bed 10 and is recessed therein to provide a check as to the working of the thermostat.

In Figures 3 and 4 there is shown a slight modification of the device of Figure 1. In this modification, the heating element 13A instead of being positioned in an elongated coil, is doubled back and forth in serpentine fashion and is maintained in position by two supports 24, one at either end of the shell 11, supports 24 being provided with recesses or notches 25 in which the loops 26 of the element 13A may be positioned. The supports 24 may be integral with the shell 11 or may be partitions positioned therein and serve to hold the heating element adjacent the top surface of the slab 12 (or in the position shown for heating element 13 in Figure 2) while the concrete is being poured within the shell 11.

For sake of clarity no pins 20 or reinforcing screen 14 is shown in Figures 3 and 4, but it is to be understood that they may likewise be utilized with this modification as desired.

In operation the slab 12 will be uniformly heated on its top surface, will thus assure a warm dry bed constantly and will evaporate or vaporize any moisture which may be present on the slab from the pigs. Further, heating the top surface of the slab will warm the air by contact and the air will rise and warm the sides and backs of the animals.

In some instances, it may be preferable to add a granularmetric hardening composition to the top surface of the slab 12, such hardening compositions providing increased wear resistance, reducing deterioration from oils, fats, acids, sugar, organic wastes, and resisting steam or moisture conditions, etc. These granularmetric hardening materials are dusted over the surface of the concrete after levelling. They may be of the iron-oxidation type, comprising a finely ground metallic powder chemically processed, so that the addition of the water results in the oxidation of the particles and metals and a consequent expansion of these particles in the pores of the concrete, such as "Metalon," a product of the A. C. Horn Company, Inc., Long Island City 1, New York, or may comprise fused aggregates and hardening elements together with cementitious binders such as "Colorundum," or "Durafax," likewise made by the same company.

As many widely differing embodiments of this invention may be made without departing from the spirit and scope thereof, it is to be understood that the specific embodiments described are given by way of example only and the invention is limited only by the terms of the appended claims.

What is claimed is:

1. An animal bed comprising in combination a shell of rigid synthetic resinous material, said shell having a peripheral upright wall provided with rounded corners joined to an integral planar bottom and thus forming a dished member, said shell including a plurality of projections upon the inner surface thereof and interior of said wall, a reinforcing screen element positioned above said projections and an electrical resistance element disposed above said screen element in an endless planar pattern, a concrete slab coextensive with the dished portion of said shell and embedding said projections, screen element and resistance element therein, a thermostat for controlling the amount of electricity supplied to said resistance element and a flexible sleeve secured to said shell for protecting a portion of said resistance element extending therefrom.

2. An animal bed comprising in combination a shell of rigid synthetic resinous material, said shell having a peripheral upright wall provided with rounded corners joined to an integral planar bottom and thus forming a dished member, said shell including a plurality of projections upon the inner surface thereof and interior of said wall, a reinforcing screen element positioned above said projections and an electrical resistance element disposed above said screen element in an endless planar pattern, a concrete slab co-extensive with the dished portion of said shell and embedding said projections, screen element and resistance element therein, a thermostat for controlling the amount of electricity supplied to said resistance element and a pair of parallel supporting members disposed one adjacent each end of said shell and providing means for positioning said resistance element.

3. An animal bed comprising in combination a shell of rigid synthetic resinous material, said shell having a peripheral upright wall provided with rounded corners joined to an integral planar bottom and thus forming a dished member, said shell including a plurality of projections upon the inner surface thereof and interior of said wall, a reinforcing screen element positioned above said projections and an electrical resistance element disposed above said screen element in an endless planar pattern, a concrete slab co-extensive with the dished portion of said shell and embedding said projections, screen element and resistance element therein, a thermostat for controlling the amount of electricity supplied to said resistance element and the top surface of said concrete including a granular-metric hardening composition.

4. An animal bed comprising in combination a shell of rigid synthetic resinous material, said shell having a peripheral upright wall provided with rounded corners joined to an integral planar bottom and thus forming a dished member, said shell including a plurality of projections upon the inner surface thereof and interior of said wall, a reinforcing screen element positioned above said projections and an electrical resistance element disposed above said screen element in an endless planar pattern, a concrete slab co-extensive with the dished portion of said shell and embedding said projections, screen element and resistance element therein, a thermostat for controlling the amount of electricity supplied to said resistance element and said concrete and said rigid synthetic resinous material having substantially the same coefficient of expansion.

5. An animal bed comprising in combination a shell having a peripheral upright wall joined to an integral planar bottom and thus forming a dished member, an electrical resistance element composed of a plurality of transversely disposed wires in an endless planar pattern and positioned within said dished member, a concrete slab co-extensive with the dished portion of said shell, a thermostat for controlling the amount of electricity supplied to said resistance element and a pair of parallel supporting members disposed one adjacent each end of said shell and providing means for positioning said transversely disposed wires, and the top surface of said concrete including a granular-metric hardening composition.

6. An animal bed comprising in combination a shell of rigid synthetic resinous material having a peripheral upright wall joined to an integral planar bottom and thus forming a dished member, an electrical resistance element composed of a plurality of transversely disposed wires in an endless planar pattern and positioned within said dished member, a concrete slab co-extensive with the dished portion of said shell, a thermostat for controlling the amount of electricity supplied to said resistance element and a pair of parallel supporting members disposed one adjacent each end of said shell and providing means for positioning said transversely disposed wires, and said concrete and said rigid synthetic resinous material having substantially the same coefficient of expansion.

7. A rectangular dished member of synthetic resinous material comprising in combination, a planar bottom having a plurality of projections on the inner surface thereof, a screen element positioned above the said projections, an electrical resistance element composed of a plurality of transversely disposed wires and positioned above said screen, said resistance element having attached means for controlling the amount of electrical current supplied thereto, elongated supporting members disposed over the inner surface of said planar bottom providing means for positioning said resistance element, a slab of plastic material positioned within said rectangular dished shaped member and embedding said projections, screen element, resistance element and elongated supporting members, said plastic material having a granular-metric hardening composition disposed over its surface and having a coefficient of expansion substantially the same as said synthetic resinous material, means secured to said rectangular dished shaped member to protect the portion of said resistance element extending therefrom.

8. An animal bed comprising in combination, a shell of synthetic resinous material, said shell having a peripheral wall joined to an integral planar bottom forming a dished member, a plurality of projections upon the inner surface of said planar bottom, a reinforcing screen element positioned above said projections, an electric resistance element disposed above said screen element in an endless planar pattern, means attached to said resistance element for controlling the amount of electric current supplied thereto, parallel supporting members disposed transversely over the inner surface of said planar bottom for supporting said resistance element, a concrete slab positioned within and contiguous to said peripheral wall of said shell and embedding said projections, screen element, resistance element and parallel supporting members, said concrete slab including a granular-metric hardening composition disposed over its top surface and having a coefficient of expansion substantially the same as the said synthetic resinous material, a flexible sleeve secured to said shell for protecting that part of the said resistance element extending from said shell.

References Cited in the file of this patent

UNITED STATES PATENTS

| | | |
|---|---|---|
| 1,144,942 | Lidberg | June 29, 1915 |
| 1,742,159 | Hynes | Dec. 31, 1929 |
| 1,866,097 | Gaetje et al. | July 5, 1932 |
| 2,071,186 | Tofano | Feb. 16, 1937 |
| 2,138,217 | Sutter | Nov. 29, 1938 |
| 2,612,585 | McCann | Sept. 30, 1952 |
| 2,617,005 | Jorgensen | Nov. 4, 1952 |
| 2,743,347 | Porter | Apr. 24, 1956 |